(12) United States Patent
Tsirkin (10) Patent No.: US 11,475,131 B2
(45) Date of Patent: Oct. 18, 2022

(54) HYPERVISOR LEVEL SIGNATURE CHECKS FOR ENCRYPTED TRUSTED EXECUTION ENVIRONMENTS

(71) Applicant: Red Hat, Inc., Raleigh, NC (US)

(72) Inventor: Michael Tsirkin, Westford, MA (US)

(73) Assignee: Red Hat, Inc., Raleigh, NC (US)

( * ) Notice: Subject to any disclaimer, the term of this patent is extended or adjusted under 35 U.S.C. 154(b) by 216 days.

(21) Appl. No.: 16/773,319

(22) Filed: Jan. 27, 2020

(65) Prior Publication Data

US 2021/0232681 A1 Jul. 29, 2021

(51) Int. Cl.
| | |
|---|---|
| G06F 21/00 | (2013.01) |
| G06F 21/56 | (2013.01) |
| G06F 9/455 | (2018.01) |
| G06F 21/60 | (2013.01) |
| G06F 21/57 | (2013.01) |

(52) U.S. Cl.
CPC ........ *G06F 21/561* (2013.01); *G06F 9/45558* (2013.01); *G06F 21/575* (2013.01); *G06F 21/602* (2013.01); *G06F 2009/45587* (2013.01); *G06F 2221/033* (2013.01)

(58) Field of Classification Search
CPC .. G06F 21/561; G06F 9/45558; G06F 21/575; G06F 21/602; G06F 2009/45587; G06F 2221/033; G06F 21/44; G06F 21/53

See application file for complete search history.

(56) References Cited

U.S. PATENT DOCUMENTS

| | | | |
|---|---|---|---|
| 8,752,047 | B2 | 6/2014 | Banga et al. |
| 10,152,600 | B2 | 12/2018 | Rozas et al. |
| 10,181,037 | B2 | 1/2019 | Novak et al. |
| 11,200,047 | B2 * | 12/2021 | Doebel ................... G06F 8/656 |
| 2007/0118899 | A1 * | 5/2007 | Sridhar ................ H04B 1/0003 |
| | | | 726/22 |
| 2010/0318762 | A1 * | 12/2010 | Malyugin ........... G06F 12/0891 |
| | | | 711/207 |

(Continued)

FOREIGN PATENT DOCUMENTS

CN 106462438 A 2/2017

OTHER PUBLICATIONS

Liu et al., "Software abstractions for trusted sensors", MobiSys '12: Proceedings of the 10th international conference on Mobile systems, applications, and services, pp. 365-378, (Year: Jun. 2012).*

(Continued)

*Primary Examiner* — Morshed Mehedi
(74) *Attorney, Agent, or Firm* — K&L Gates LLP (57) ABSTRACT

A system includes a hypervisor, a memory, and boot firmware stored in the memory. The boot firmware is configured to execute on a processor to load a trusted code that includes a condition checker from the hypervisor, check a signature of the trusted code, and verify the signature is trusted by a guest. The boot firmware is also configured to load the trusted code into an encrypted memory at a known guest address. The hypervisor is configured to protect the known guest address. The trusted code includes a first instruction, one or more intermediate instructions, and a final instruction. The first instruction and the final instruction are exits to the hypervisor. The hypervisor is also configured to execute the condition checker and detect an inconsistency in guest memory.

18 Claims, 7 Drawing Sheets

(56) References Cited

U.S. PATENT DOCUMENTS

| | | | | |
|---|---|---|---|---|
| 2012/0117566 A1* | 5/2012 | Maeda | ............... | G06F 21/556 |
| | | | | 718/1 |
| 2013/0205106 A1* | 8/2013 | Tati | ............... | G06F 3/0655 |
| | | | | 711/159 |
| 2016/0259731 A1* | 9/2016 | Evans | ............... | G06F 12/10 |
| 2017/0046255 A1* | 2/2017 | Tsirkin | ............... | G06F 12/1009 |
| 2017/0206104 A1* | 7/2017 | Sliwa | ............... | G06F 3/0659 |
| 2018/0081824 A1* | 3/2018 | Bacher | ............... | H04L 9/3247 |
| 2019/0095351 A1* | 3/2019 | Chhabra | ............... | G06F 21/79 |
| 2020/0065527 A1* | 2/2020 | Rodgers | ............... | H04L 9/0631 |
| 2021/0049263 A1* | 2/2021 | Kiperberg | ............... | G06F 21/575 |

OTHER PUBLICATIONS

Mike Borza, CTO, Elliptic Technologies Inc.; "Secure Virtualization as an Enabler of Trusted Execution Environments in Embedded Computing"; Jun. 29, 2015; 6 Pages.

Mathias Morbitzer; Manuel Huber; Julian Horsch; "Extracting Secrets from Encrypted Virtual Machines"; Fraunhofer AISEC Garching near Munich, Germany; Jan. 7, 2019; 10 Pages.

Jakub Szefer and Ruby B. Lee; "A Case for Hardware Protection of Guest VMs from Compromised Hypervisors in Cloud Computing"; Dept. of Electrical Engineering Princeton University; Jun. 2011; 6 Pages.

* cited by examiner

| Page Table 200B | | |
|---|---|---|
| Page Entry 202A | PFN 210A X0001 | 220A Non-executable | 230A Address of Unallocated Memory x01AF |
| Page Entry 202B | PFN 210B X0002 | 220B Executable | 230B Address of Trusted Code x01FF |
| Page Entry 202C | PFN 210C X0003 | 220C Non-executable | 230C Address of Regular Guest Code x024F |
| Page Entry 202D | PFN 210D X0004 | 220D Non-executable | 230D Address of Regular Guest Code x029F |
| Page Entry 202E | PFN 210E X0005 | 220E Non-executable | 230E Address of Memory Allocated to App x02FF |

HYPERVISOR LEVEL SIGNATURE CHECKS FOR ENCRYPTED TRUSTED EXECUTION ENVIRONMENTS

BACKGROUND

Trusted execution environments may be used to provide some physical components as logical objects in order to allow running various software modules, for example, multiple operating systems, concurrently and in isolation from other software modules, on one or more interconnected physical computer systems. Trusted execution environments may allow, for example, for consolidating multiple physical servers into one physical server running multiple guest virtual machines in order to improve the hardware utilization rate.

Virtualization may be achieved by running a software layer, often referred to as a hypervisor, above the hardware and below the trusted execution environment, such as guest virtual machines or containers. A hypervisor may run directly on the server hardware without an operating system beneath it or as an application running on a traditional operating system. A hypervisor may virtualize the physical layer and provide interfaces between the underlying hardware and trusted execution environments. In some cases, the trusted execution environments may be encrypted for security purposes.

SUMMARY

The present disclosure provides new and innovative systems and methods for hypervisor level signature checks for encrypted trusted execution environments, such as virtual machines. In an example, a system includes a hypervisor, a memory, and boot firmware stored in the memory. The boot firmware is configured to execute on a processor to load a trusted code that includes a condition checker from the hypervisor, check a signature of the trusted code, and verify the signature is trusted by a guest. The boot firmware is also configured to load the trusted code into an encrypted memory at a known guest address. The hypervisor is configured to protect the known guest address. The trusted code includes a first instruction, one or more intermediate instructions, and a final instruction. The first instruction and the final instruction are exits to the hypervisor. The hypervisor is also configured to execute the condition checker and detect an inconsistency in guest memory.

In an example, a method includes loading, by a boot firmware, a trusted code that includes a condition checker from the hypervisor. The boot firmware checks a signature of the trusted code and verifies that a guest trusts the signature. Then, the boot firmware loads the trusted code into an encrypted memory at a known guest address. The trusted code includes a first instruction, one or more intermediate instructions, and a final instruction. The first instruction and the final instruction are exits to the hypervisor. The method also includes protecting, by the hypervisor, the known guest address. The hypervisor also executes the condition checker and detects an inconsistency in guest memory.

In an example, a non-transitory machine-readable medium storing code, which when executed by a processor is configured to load a trusted code that includes a condition checker from the hypervisor, check a signature of the trusted code and verify the signature is trusted by a guest. The non-transitory machine-readable medium is also configured to load the trusted code into an encrypted memory at a known guest address and protect the known guest address. The trusted code includes a first instruction, one or more intermediate instructions, and a final instruction. Additionally, the first instruction and the final instruction are exits to the hypervisor. The non-transitory machine-readable medium is also configured to execute the condition checker and detect an inconsistency in the guest memory.

Additional features and advantages of the disclosed method and apparatus are described in, and will be apparent from, the following Detailed Description and the Figures. The features and advantages described herein are not all-inclusive and, in particular, many additional features and advantages will be apparent to one of ordinary skill in the art in view of the figures and description. Moreover, it should be noted that the language used in the specification has been principally selected for readability and instructional purposes, and not to limit the scope of the inventive subject matter.

DETAILED DESCRIPTION OF EXAMPLE EMBODIMENTS

Techniques are disclosed for providing hypervisor level signature checks for encrypted trusted execution environments ("TEEs"), such as a virtual machines ("VMs"). Hypervisor level antivirus solutions have several advantages over running antivirus solutions within a virtual machine. In particular, hypervisor level antivirus solutions are more trustworthy (e.g., it is easier to trust that the antivirus software has not been tampered with). Typically, hypervisor level antivirus solutions work by scanning guest random access memory ("RAM") for virus signatures. Unfortunately, scanning guest RAM breaks with encrypted VMs (or containers) since accessing guest memory from the hypervisor 180 is impossible when the guest memory is encrypted. However, trusted execution environments are gaining popularity, and support for extra security (e.g., scanning for viruses) in the trusted execution environments (e.g., an encrypted VM) is becoming more important. In some cases, malicious code in TEEs, such as an encrypted virtual machine, may be used to attack hosts.

To improve security and perform antivirus checks within a TEE, such as an encrypted VM, special code is introduced into the TEE that can be trusted by both the hypervisor (i.e., host) and a guest (i.e., tenant) of the TEE (e.g., VM). For example, at guest boot, after attestation but before loading the guest, boot firmware loads trusted code from the hypervisor. Then, the boot firmware checks the signature of the trusted code and verifies that the signature is trusted by the guest (e.g., tenant of VM). The trusted code is then loaded into encrypted memory at a known guest address and the hypervisor write-protects the trusted code, which prevents the guest from modifying the trusted code. The trusted code, which includes a condition checker (e.g., an antivirus checker), may include instructions to exit to the hypervisor as both a first and last instruction. Whenever the hypervisor needs to execute the antivirus checker, the hypervisor sends a notification (e.g., an interrupt) to the guest. After sending the interrupt to the guest, the hypervisor expects the guest to execute the first exit to the hypervisor. Lack of such an exit may indicate that the guest is unhealthy or infected. In that case, the hypervisor 180 may terminate the guest or the TEE.

After detecting the first exit, the hypervisor makes only the trusted code executable and returns to the guest. Then, the trusted code proceeds to run, which performs the virus check. For example, the trusted code may execute an antivirus engine that looks for virus signatures in guest memory. Since the trusted code runs within the TEE, such as a VM, the trusted code has full access to encrypted memory and hypervisor-level antivirus logic works even though the hypervisor typically does not have access to encrypted memory.

When the hypervisor detects the second exit, the hypervisor loads the execution result from the guest. If the execution result shows that the encrypted TEE is virus free, the hypervisor may mark the regular guest code executable and then returns into the TEE. Since the trusted code cannot be modified by the guest, it is trusted by the hypervisor and since the trusted code is verified by attested firmware, the trusted code is also trusted by the guest. Hypervisor level antivirus solutions assume full access to guest memory, which is typically unavailable for encrypted TEEs. However, the above techniques advantageously allow hypervisor level antivirus solutions to be performed for encrypted TEEs thereby improving security and adding antivirus support for encrypted TEEs.

Figure 1:
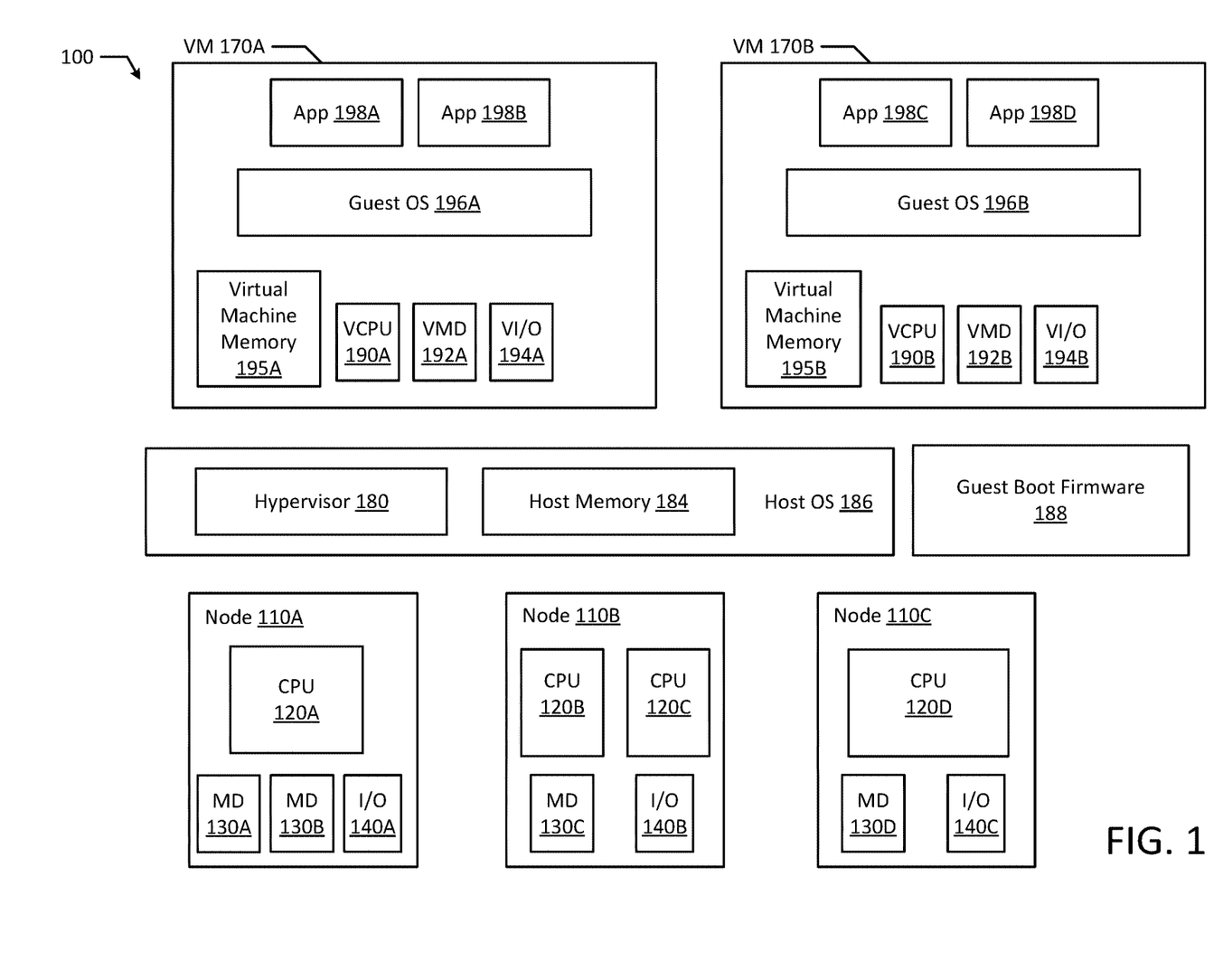
FIG. 1 illustrates a block diagram of an example computer system according to an example embodiment of the present disclosure.

FIG. 1 depicts a high-level component diagram of an example computing system 100 in accordance with one or more aspects of the present disclosure. The computing system 100 may include an operating system (e.g., host OS 186), one or more TEEs (e.g., virtual machines 170A-B), nodes (e.g., nodes 110A-C), and guest boot firmware 188.

Virtual machines 170A-B may include a guest OS, guest memory, a virtual CPU (VCPU), virtual memory devices (VIVID), and virtual input/output devices (VI/O). For example, virtual machine 170A may include guest OS 196A, guest memory or virtual machine memory 195A, a virtual CPU 190A, a virtual memory devices 192A, and virtual input/output device 194A. Virtual machine memory 195A may include one or more memory pages. Similarly, virtual machine 170B may include guest OS 196B, virtual machine memory 195B, a virtual CPU 190B, a virtual memory devices 192B, and virtual input/output device 194B. Virtual machine memory 195B may include one or more memory pages.

The computing system 100 may also include a hypervisor 180 and host memory 184. Hypervisor 180 may manage host memory 184 for the host operating system 186 as well as memory allocated to the virtual machines 170A-B and guest operating systems 196A-B such as guest memory or virtual machine memory 195A-B provided to guest OS 196A-B.

Host memory 184 and virtual machine memory 195A-B may be divided into a plurality of memory pages that are managed by the hypervisor 180. Virtual machine memory 195A-B allocated to the guest OS 196A-B may be mapped from host memory 184 such that when a guest application 198A-D uses or accesses a memory page of virtual machine memory 195A-B, the guest application 198A-D is actually using or accessing host memory 184.

In an example, a virtual machine 170A may execute a guest operating system 196A and run applications 198A-B which may utilize the underlying VCPU 190A, VIVID 192A, and VI/O device 194A. One or more applications 198A-B may be running on a virtual machine 170A under the respective guest operating system 196A. A virtual machine (e.g., VM 170A-B, as illustrated in FIG. 1) may run on any type of dependent, independent, compatible, and/or incompatible applications on the underlying hardware and OS. In an example, applications (e.g., App 198A-B) run on a virtual machine 170A may be dependent on the underlying hardware and/or OS 186. In another example, applications 198A-B run on a virtual machine 170A may be independent of the underlying hardware and/or OS 186. For example, applications 198A-B run on a first virtual machine 170A may be dependent on the underlying hardware and/or OS 186 while applications (e.g., application 198C-D) run on a second virtual machine (e.g., VM 170B) are independent of the underlying hardware and/or OS 186A. Additionally, applications 198A-B run on a virtual machine 170A may be compatible with the underlying hardware and/or OS 186. In an example, applications 198A-B run on a virtual machine 170A may be incompatible with the underlying hardware and/or OS 186. For example, applications 198A-B run on one virtual machine 170A may be compatible with the underlying hardware and/or OS 186A while applications 198C-D run on another virtual machine 170B are incompatible with the underlying hardware and/or OS 186A. In an example, a device may be implemented as a virtual machine (e.g., virtual machine 170A-B).

The guest boot firmware 188 may be configured to execute on a processor to load a trusted code that includes a condition checker from a hypervisor 180. For example, the hypervisor 180 may provide trusted code to the guest boot firmware 188. In an example, the condition checker may be an antivirus checker. The guest boot firmware 188 may also check a signature of the trusted code and verify that the signature is trusted by the guest (e.g., guest OS 196A-B). After verifying the signature is trusted, the guest boot firmware 188 loads the trusted code into an encrypted memory at a known guest address.

The hypervisor protects (e.g., write-protects) the known guest address associated with the trusted code. Additionally, the trusted code includes instructions to exit to the hypervisor 180 prior to executing the condition checker. After executing the condition checker (e.g., antivirus checker), the trusted code also includes instructions to exit back to the hypervisor 180. By executing the condition checker, the hypervisor is able to detect an inconsistency, such as a virus, in encrypted guest memory. In an example, the condition checker may be a section of code within the trusted code.

The computer system 100 may include one or more nodes 110A-C. Each node 110A-C may in turn include one or more physical processors (e.g., CPU 120A-D) communicatively coupled to memory devices (e.g., MD 130A-D) and input/output devices (e.g., I/O 140A-C). Each node 110A-C may be a computer, such as a physical machine and may include a device, such as hardware device. In an example, a hardware device may include a network device (e.g., a network adapter or any other component that connects a computer to a computer network), a peripheral component interconnect (PCI) device, storage devices, disk drives, sound or video adaptors, photo/video cameras, printer devices, keyboards, displays, etc. Virtual machines 170A-B may be provisioned on the same host or node (e.g., node 110A) or different nodes. For example, VM 170A and VM 170B may both be provisioned on node 110A. Alternatively, VM 170A may be provided on node 110A while VM 170B is provisioned on node 110B.

As used herein, physical processor, processor or CPU 120A-D, refers to a device capable of executing instructions encoding arithmetic, logical, and/or I/O operations. In one illustrative example, a processor may follow Von Neumann architectural model and may include an arithmetic logic unit (ALU), a control unit, and a plurality of registers. In a further aspect, a processor may be a single core processor which is typically capable of executing one instruction at a time (or process a single pipeline of instructions), or a multi-core processor which may simultaneously execute multiple instructions. In another aspect, a processor may be implemented as a single integrated circuit, two or more integrated circuits, or may be a component of a multi-chip module (e.g., in which individual microprocessor dies are included in a single integrated circuit package and hence share a single socket). A processor may also be referred to as a central processing unit (CPU).

As discussed herein, a memory device 130A-D refers to a volatile or non-volatile memory device, such as RAM, ROM, EEPROM, or any other device capable of storing data. As discussed herein, I/O device 140A-C refers to a device capable of providing an interface between one or more processor pins and an external device capable of inputting and/or outputting binary data.

Processors (e.g., CPUs 120A-D) may be interconnected using a variety of techniques, ranging from a point-to-point processor interconnect, to a system area network, such as an Ethernet-based network. Local connections within each node, including the connections between a processor (e.g., CPU 120A-D) and a memory device 130A-D may be provided by one or more local buses of suitable architecture, for example, peripheral component interconnect (PCI).

Figure 2:
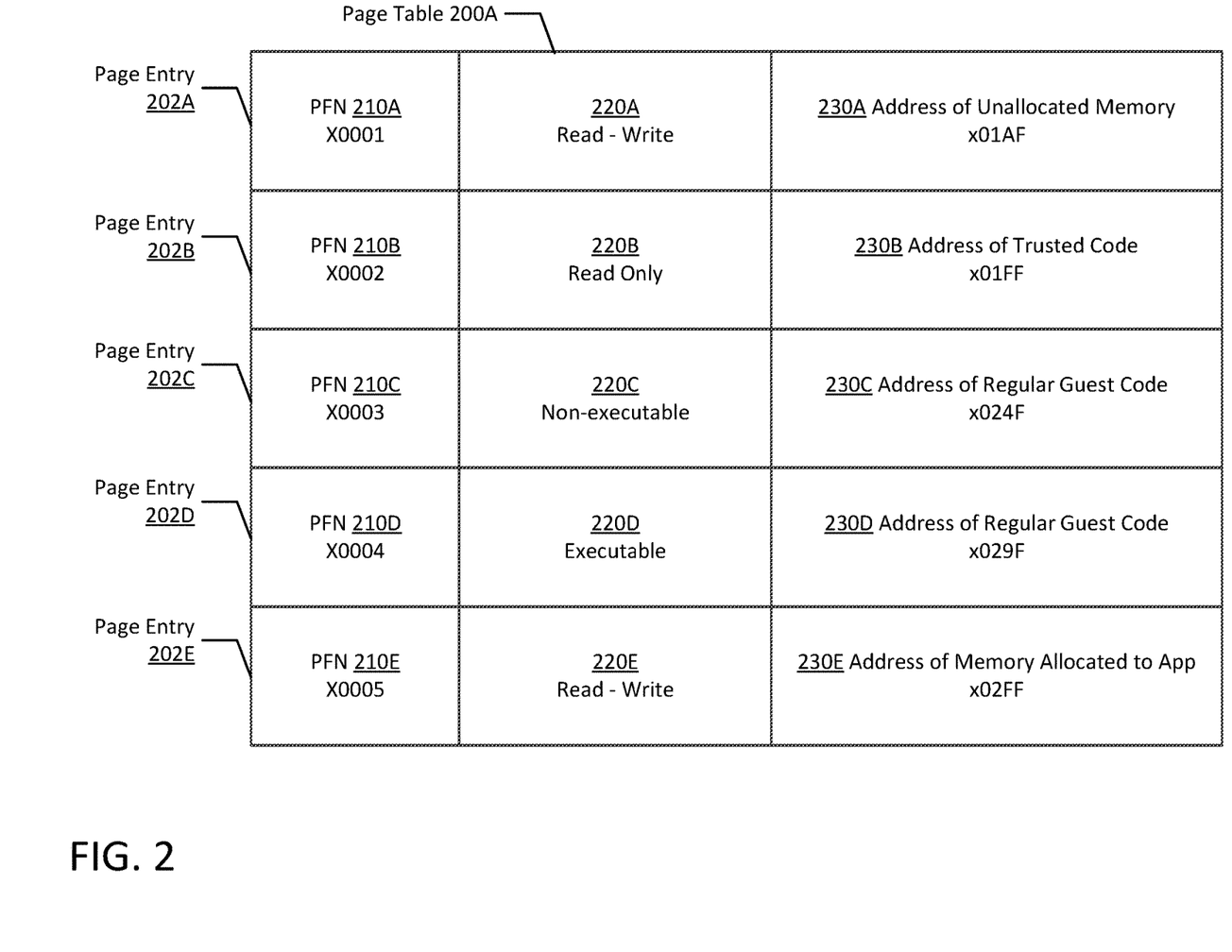
FIG. 2 illustrates a block diagram of an example page table according to an example embodiment of the present disclosure.
Figure 3:
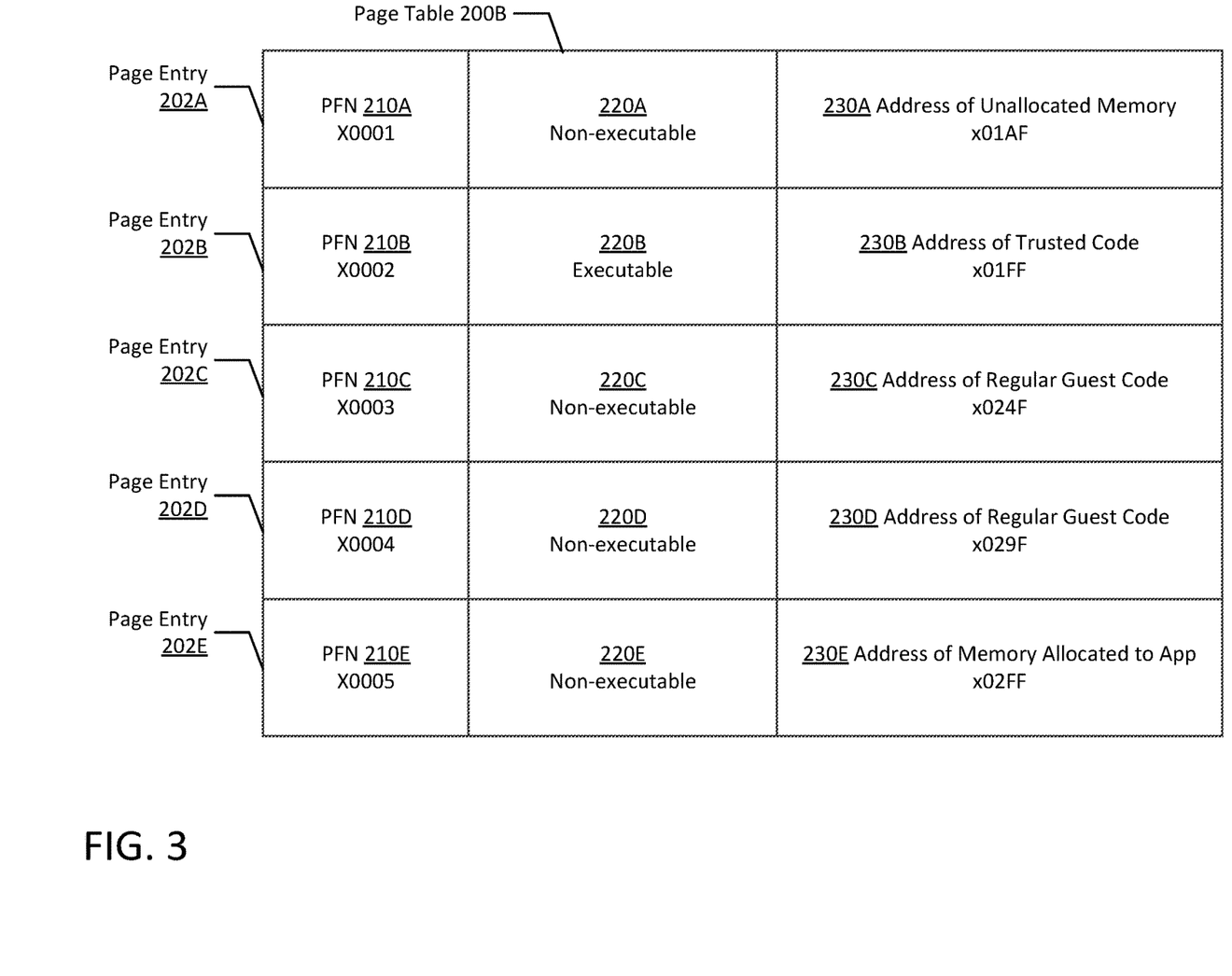
FIG. 3 illustrates a block diagram of an example page table according to an example embodiment of the present disclosure.

FIG. 2 illustrates a block diagram of a page table 200A and FIG. 3 illustrates a block diagram of page table 200B according to an example of the present disclosure. The page tables 200A-B may be a host page table. In general, the OS 186 may manage 195 the memory usage of the applications 198A-D. The physical memory associated with the applications 198A-D may be divided into pages, which are identified with a unique number (e.g., Page Frame Number (PFN) 210A-E).

Page tables 200A-B are data structures that may be used to store a mapping of memory addresses of the host memory to memory addresses of the memory available to the encrypted TEEs, such as virtual machines. Accordingly, address translation may be handled using page table(s) 200A-B. In an example, the page table(s) 200A-B stores a mapping of virtual address to physical addresses.

The page table(s) 200A-B comprises page entries 202A-E that map PFN 210A-E (e.g., an address of TEE memory, such as virtual memory in the application space) with an address 230A-E. Page tables 200A-B may be used together with any paging data structure to support translation between addresses (e.g., 32-bit linear address space using a two-level hierarchical paging structure, Physical Address Extension mode, INTEL Extended Memory 64 Technology mode, etc.).

In an example, page tables 200A-B may include protection identifiers 220A-E. The protection identifier 220A-E may indicate the access status of a page corresponding to the page entry 202A-E of the page tables 200A-B. For example, a protection identifier 220A-E may be used to define that a given page is writable (or read-write), write-protected (or read-only), executable (or executable and readable), executable only, etc. As illustrated in the example in FIG. 2, the page corresponding to page entry 202A, PFN 210A address (x0001), address 230A (x01AF), and protection identifier 220A has been defined in page table 200A as 'Read-Write'. For example, page entry 202A may map PFN 210A (e.g., address of unallocated memory) to address 230A (e.g., address of physical memory of host OS 186).

Page entry 202B is associated with a protection identifier 220B defined as "Read Only". For example, page entry 202B may map PFN 210B (e.g., address of trusted code in the application space) to address 230B (e.g., address of physical memory of host OS 186). Page entry 202C is associated with a protection identifier 220C defined as "Non-executable". For example, page entry 202C may map PFN 210C (e.g., address of regular guest code in the application space) to address 230C (e.g., address of physical memory of host OS 186). Page entry 202D is associated with a protection identifier 220D defined as "Executable". For example, page entry 202D may map PFN 210D (e.g., address of regular guest code in the application space) to address 230D (e.g., address of physical memory of host OS 186). Page entry 202E is associated with a protection identifier 220E defined as "Read-Write". For example, page entry 202E may map PFN 210E (e.g., address of memory allocated to an application in the application space) to address 230E (e.g., address of physical memory of host OS 186).

As illustrated in FIG. 3, the protection identifier associated with the trusted code is changed to "Executable" while all the other memory entries are changed to "non-executable." For example, page entry 202A associated with an address of unallocated memory is set to "Non-executable." Similarly, page entry 202C-D for regular guest code and page entry 202E for memory allocated to an application are also set to "Non-executable." The page entry 202B associated with the trusted code is set to "Executable." For example, the hypervisor 180 may initially write-protect the trusted code (e.g., by write protecting the known guest address associated with the trusted code) as illustrated in FIG. 2. After the guest exits to the hypervisor, the hypervisor 180 may execute the condition checker (e.g., antivirus checker) by making the trusted code executable. For example, as illustrated in FIG. 3, the hypervisor 180 may change the protection identifier in page table 200B associated with the trusted code at the known guest address to "executable." While making this change, the hypervisor 180 may also make other code such as regular guest code (e.g., non-trusted code) "Non-executable."

By doing so, the condition checker can scan guest memory and check for viruses in encrypted memory. Making those portions of code (e.g., guest code that may have inconsistencies or that may be affected with a virus) "Non-executable" prevents any code that may have inconsistencies or viruses from executing. After the hypervisor 180 confirms that the encrypted guest memory is inconsistency free (e.g., is virus free), the hypervisor 180 may then again make the other guest code (e.g., regular guest code) "Executable". Such a configuration allows the system to support hypervisor level antivirus solutions for encrypted TEEs. For example, hypervisor level antivirus solutions assume full access to guest memory, which is typically unavailable for encrypted TEEs. However, the above techniques advantageously allow hypervisor level antivirus solutions to be performed for encrypted TEEs thereby improving security and adding antivirus support for encrypted TEEs.

In addition, the page table(s) 200A-B may include additional information not shown in FIG. 2 or FIG. 3 including statistics information, background information, dirty identifiers which indicate that modifications to a page must be written back to disk, etc. The sizes of different page tables 200A-B may vary and may include more or fewer entries than are illustrated in FIG. 2 and FIG. 3.

Figure 4:
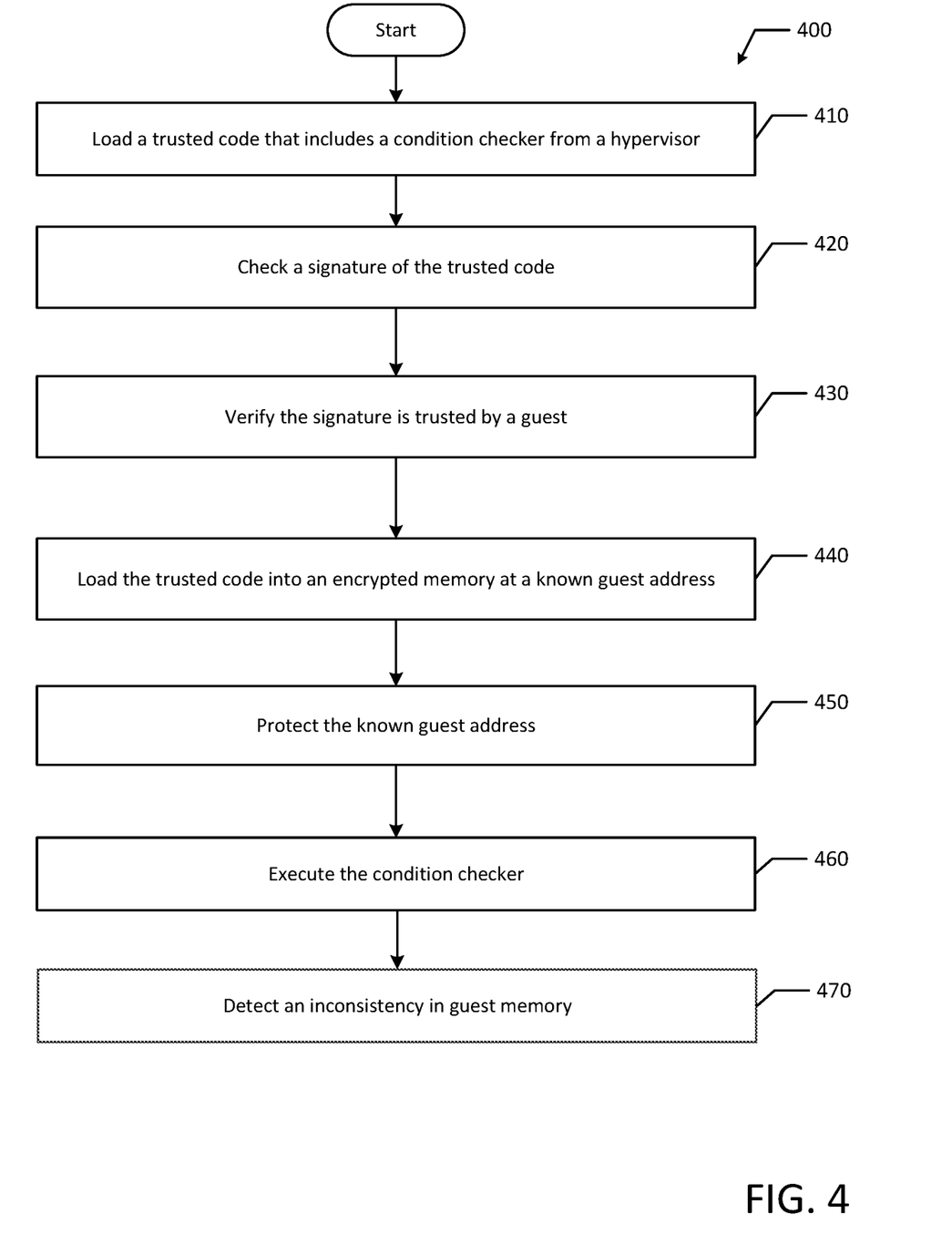
FIG. 4 illustrates a flowchart of an example process for detecting inconsistencies in guest memory according to an example embodiment of the present disclosure.

FIG. 4 illustrates a flowchart of an example method 400 for detecting inconsistencies in guest memory for encrypted TEEs in accordance with an example of the present disclosure. Although the example method 400 is described with reference to the flowchart illustrated in FIG. 4, it will be appreciated that many other methods of performing the acts associated with the method 400 may be used. For example, the order of some of the blocks may be changed, certain blocks may be combined with other blocks, blocks may be repeated, and some of the blocks described are optional. The method 400 may be performed by processing logic that may comprise hardware (circuitry, dedicated logic, etc.), software, or a combination of both.

In the illustrated example, method 400 includes loading a trusted code that includes a condition checker from a hypervisor (block 410). For example, a boot firmware 188 may load the trusted code, which includes a condition checker (e.g., antivirus protection code). The trusted code may be received from a hypervisor 180. In an example, the boot firmware 188 loads the trusted code at guest boot, after attestation, but before loading the guest. The method also includes checking a signature of the trusted code (block 420). For example, the boot firmware 188 may check a signature of the trusted code. The signature may be a digital signature, such as a certificate-based digital signature. Additionally, the method includes verifying the signature is trusted by a guest (block 430). For example, the boot firmware 188 may verify the signature is trusted by a guest OS 196A. The certificate-based digital signature may be used to sign executables and scripts in order to verify the code author's identity and ensure that the trusted code has not been changed or corrupted since it was signed, which helps the other tenants or guests determine whether the software (e.g., trusted code) can be trusted.

The method also includes loading the trusted code into an encrypted memory at a known guest address (block 440). For example, the boot firmware 188 may load the trusted code into an encrypted memory at a known guest address. The trusted code may include a plurality of instructions such as a first instruction, one or more intermediate instructions and a final instruction. The first instruction and the final instruction may be exits to the hypervisor 180. The intermediate instructions may include execution instructions for the condition checker (e.g., an antivirus checker).

The method includes protecting the known guest address (block 450). For example, the hypervisor 180 may protect the known guest address. Specifically, the known-guest address (e.g., guest address associated with page entry 202B in FIG. 2), which is associated with the trusted code, may be write-protected by setting a protection identifier (e.g., protection identifier 220B) in a host page table to "Read-Only." Additionally, the method includes executing the condition checker (block 460). For example, the hypervisor 180 may execute the condition checker. To execute the condition checker, the hypervisor 180 may start by sending a notification, such as an interrupt, to the guest (e.g., guest OS 196A). After sending the interrupt to the guest, the hypervisor 180 may detect a first exit to the hypervisor 180 from the first instruction in the trusted code. Then, the hypervisor 180 may make the trusted code "Executable" such that the condition checker can be executed to obtain an execution result for example, as illustrated in FIG. 2 at 220B. Then, the hypervisor 180 may detect a second exit to the hypervisor 180 from the final instruction of the trusted code.

The method also includes detecting an inconsistency in guest memory (block 470). For example, the hypervisor 180 may detect an inconsistency in the guest memory. The inconsistency may be a virus or other memory defect. The inconsistency may be described in the execution result, which may be simple message such as "pass" or "fail" to indicate that the scanned memory either passed or failed inspection. In another example, the execution result may be a report that lists the type of viruses detected and/or the quantity of viruses detected. Other information from the execution result may include the location or memory addresses associated with the inconsistencies.

If the condition checker executes and scans the encrypted memory without detecting an inconsistency in guest memory, the known guest address may again be protected such that it is safe from any future attacks or corruption from an inconsistency (e.g., virus). Additionally, if the encrypted memory passes the condition check, the original protection identifiers 220 of the regular guest code may be reverted back to their original status as illustrated in FIG. 2. For example, the protection identifier 220D for regular guest code associated with page entry 202D may be switched back from "Non-executable" to "Executable".

Figure 5A:
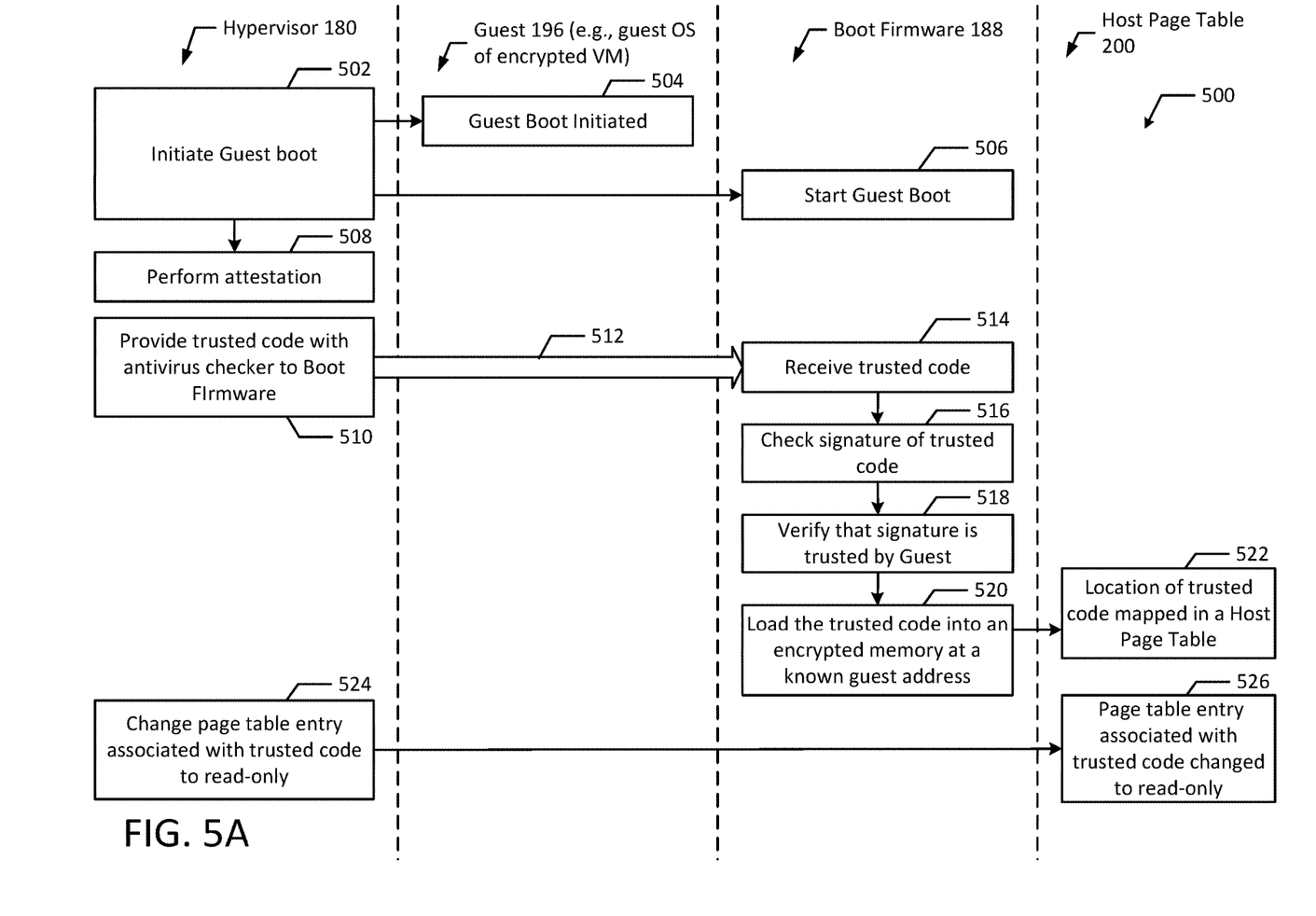
FIGS. 5A and 5B illustrate a flow diagram of an example process for detecting inconsistencies in guest memory of an encrypted virtual machine according to an example embodiment of the present disclosure.
Figure 5B:
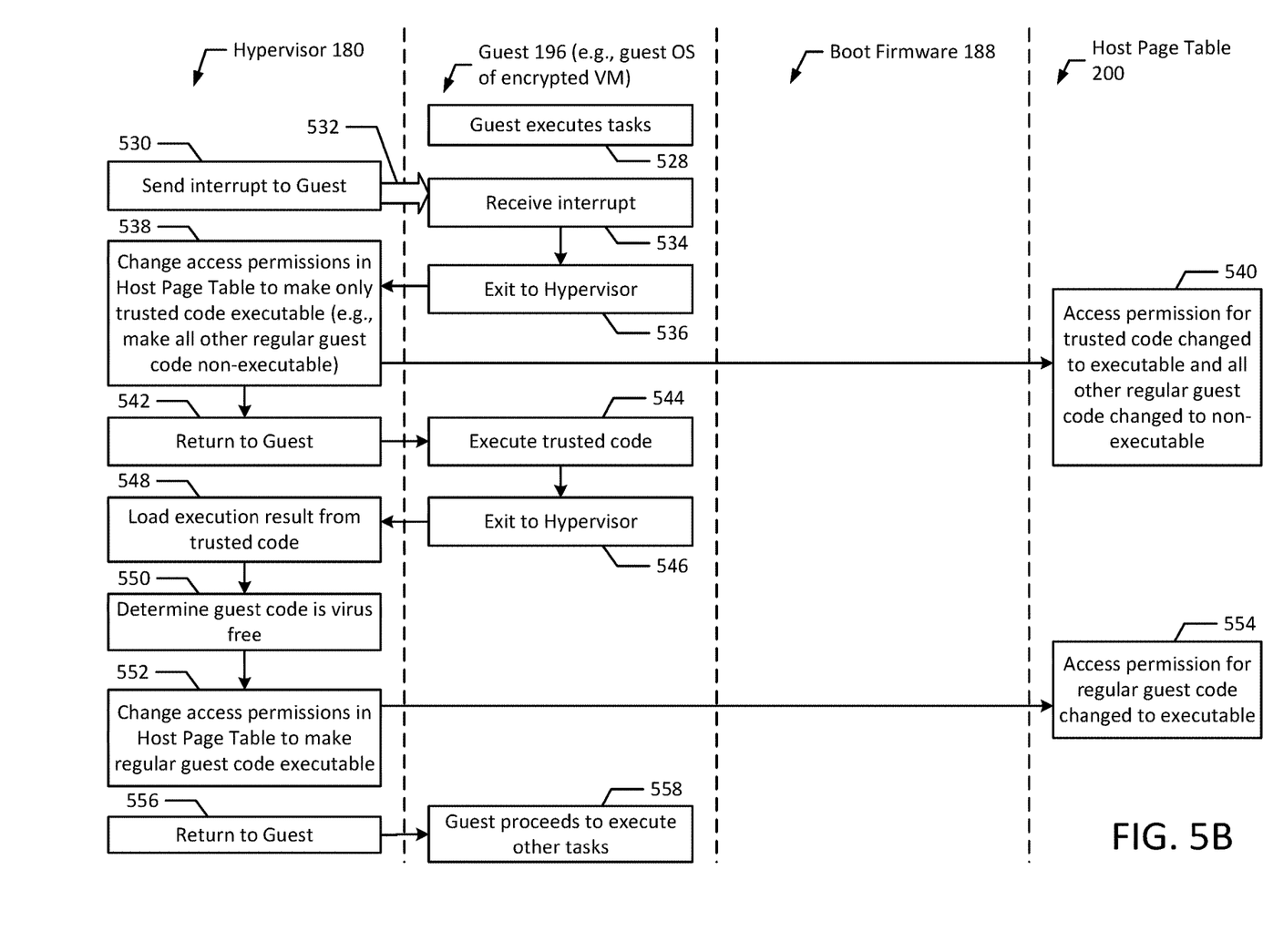

FIGS. 5A and 5B depict a flow diagram illustrating an example method 500 for detecting inconsistencies in guest memory of an encrypted VM according to an example embodiment of the present disclosure. Although the example method 500 is described with reference to the flow diagram illustrated in FIG. 5, it will be appreciated that many other methods of performing the acts associated with the method may be used. For example, the order of some of the blocks may be changed, certain blocks may be combined with other blocks, blocks may be repeated, and some of the blocks described are optional. The method may be performed by processing logic that may comprise (e.g., circuitry, dedicated logic, etc.), software, or a combination of both.

In the illustrated example, a hypervisor initiates guest boot (block 502). In an example, the guest boot may be a fresh boot or the hypervisor may initiate booting an inactive guest. The guest boot is initiated (block 504) and the boot firmware 188 starts guest boot (block 506). For example, the boot firmware 188 maybe ROM-based software that controls the TEE or virtual machine from the time that the guest is booted until the guest OS has taken control of the TEE or virtual machine.

The hypervisor 180 performs attestation (block 508). For example, the hypervisor 180 may attest the TEE (e.g., attest guest image) before loading the guest 196. Additionally, the hypervisor 180 provides trusted code 512 with an antivirus checker to the boot firmware 188 (block 510). Additionally, the trusted code 512 may be associated with a signature, such as a certificate-based digital signature, which may be used to sign executables and scripts in order to verify the code author's identity and ensure that the trusted code 512 has not been changed or corrupted since it was signed.

Then, the boot firmware 188 receives the trusted code 512 (block 514). For example, the trusted code 512 may be provided by the hypervisor 180 and may be directly sent to the boot firmware 188. After receiving the trusted code 512, the boot firmware 188 checks the signature of the trusted code 512 (block 516) and may verify that the signature is trusted by the guest 196 (block 518). For example, the boot firmware 188 may check the certificate-based digital signature of the trusted code 512 and verify that code author's identify against a list of trusted code author's with the guest 196. The boot firmware 188 may also verify the signature by ensuring that the trusted code 512 has not been changed or corrupted since it was signed.

Then, the boot firmware 188 loads the trusted code 512 into an encrypted memory at a known guest address (block 520). For example, at guest boot after attestation but before loading the guest, the boot firmware 188 loads the trusted code 512 from the hypervisor at a known guest address. The location of the trusted code 512 is mapped in a host page table 200 (block 522). For example, the trusted code 512 may be mapped in a host page table 200 and may be associated with a protection identifier 220. Then, the hypervisor 180 changes a page table entry associated with the trusted code 512 to "Read-Only" (block 524). For example, the hypervisor 180 may change the protection identifier 220 associated with the trusted code and the known guest address to "Read-Only." Now, the page table entry associated with the trusted code is changed to "Read-Only" in the host page table 200 (block 526). For example, the protection identifier 220 associated with the trusted code and the known guest address is now set to "Read-Only." Other protection identifiers may be used to write-protect the trusted code 512.

As illustrated in FIG. 5B, the guest 196 may execute tasks (block 528). For example, the guest 196 may perform tasks associated with the functions of physical devices or other resources on the computer system by sending and receiving data over a network. The hypervisor 180 sends and interrupt 532 to the guest 196 (block 530). For example, when the hypervisor wants to perform a virus scan of the guest memory, the hypervisor 180 may send an interrupt 532 to the guest 196 in order to initiate the virus scan. Then, the guest 196 receives the interrupt 532 (block 534).

After receiving the interrupt, the guest 196 exits to the hypervisor (block 536). For example, the trusted code 512 loaded in the guest may include an instruction to exit to the hypervisor 180. Then, the hypervisor 180 changes access permissions in the host page table 200 to make only the trusted code 512 executable (block 538). For example, the hypervisor 180 may make the trusted code 512 "Executable" while making all other regular guest code "non-executable." In an example, the hypervisor 180 may adjust the protection identifier(s) 220 associated with the trusted code and regular guest code in a host page table 200. Now, the access permission associated with the trusted code 512 is changed to "Executable" and the access permission for all other regular guest code is changed to "Non-executable" in the host page table 200 (block 540). For example, protection identifier(s) 220 associated with the trusted code and the known guest address may be set to "Executable" in the page table 200 while the protection identifier(s) 220 associated with regular guest code and other code are set to "Non-executable." Other protection identifiers may be used to prevent regular guest code from executing during the virus scan.

Then, the hypervisor 180 returns to the guest 196 (block 542). For example, after ensuring that only the trusted code is executable, which prevents any regular code that may have inconsistencies or viruses from executing during the virus scan, the hypervisor 180 may return to the guest 196, which is now limited to execute only the trusted code. The guest 196 executes the trusted code 512 (block 544). As discussed above, only the trusted code 512 is executable because the hypervisor prevented the guest 196 from executing any of the regular guest code (e.g., code for guest tasks, such as those associated with the functions of physical devices or other resources on the computer system, for example sending and receiving data over a network). After executing the trusted code, the guest 196 exits back to the hypervisor 180 (block 546). For example, the trusted code 512 loaded in the guest 196 may include a final instruction to exit to the hypervisor 180.

Then, the hypervisor 180 loads an execution result from the trusted code 512 (block 548). For example, any inconsistencies or viruses detected during the scan may be described in the execution result, which may be simple message such as "pass" or "fail" to indicate that the scanned memory either passed or failed inspection. In another example, the execution result may be a report that lists the type of viruses detected and/or the quantity of viruses detected. Other information from the execution result may include the location or memory addresses associated with the inconsistencies.

The hypervisor 180 also determines whether the guest code is virus free (block 550). For example, based on the execution result, the hypervisor 180 may determine whether the guest code is virus free. In an alternative example, if an inconsistency such as a virus is found, the hypervisor 180 may fix or remove the inconsistency. The hypervisor may delete the virus or corrupted memory entry or the hypervisor 180 may replace the inconsistency or infected file. In other examples, the hypervisor 180 may attempt to fix the inconsistency or quarantine the inconsistency by preventing the memory from being accessed by other programs.

After determining that the guest code is virus free, the hypervisor 180 changes the access permissions in the host page table to make regular guest code executable (block 552). For example, since the guest code was confirmed to be virus free, the hypervisor 180 may make the guest code executable so that the guest 196 can continue performing tasks. In an example, the 180 may adjust the protection identifier(s) 220 associated with the regular guest code in the host page table 200. Now, the access permission(s) associated with the regular guest code is changed to "Executable" in the host page table 200 (block 554). With an "Executable" access permission (e.g., based on the set protection identifier(s) 200 in the page table 200) the guest may execute regular guest code to perform tasks.

Then, the hypervisor 180 returns to the guest 196 (block 556). The guest 196 proceeds to execute other tasks (block 558). For example, the guest 196 may continue to perform tasks associated with the functions of physical devices or other resources on the computer system by sending and receiving data over the network. If a virus is detected, the hypervisor 180 may terminate the guest 196. By loading the trusted code directly into the encrypted memory of the guest 196, the hypervisor-level antivirus check can scan encrypted memory, which is otherwise unavailable for encrypted TEEs, such as encrypted virtual machines.

Figure 6:
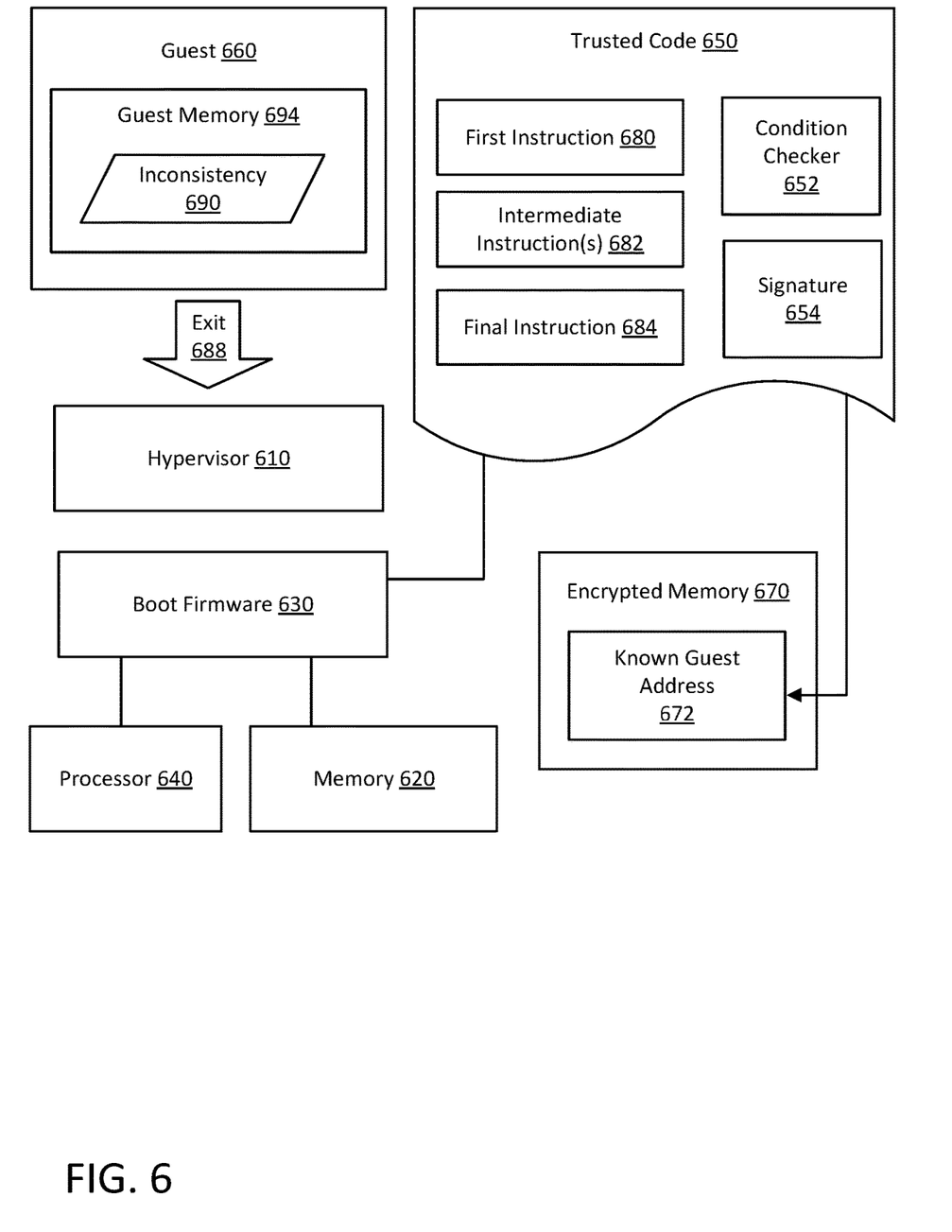
FIG. 6 illustrates a block diagram of an example encrypted trusted execution environment checking system according to an example embodiment of the present disclosure.

FIG. 6 is a block diagram of an example encrypted TEE checking system 600 according to an example embodiment of the present disclosure. The system 600 includes a hypervisor 610, a memory 620, and a boot firmware 630 stored in the memory. The boot firmware 630 is configured to execute on a processor 640 to load a trusted code 650 that includes a condition checker 652 from the hypervisor 610. The boot firmware 630 is also configured to check a signature 654 of the trusted code 650 and verify that the signature 654 is trusted by a guest 660. The boot firmware 630 is also configured to load the trusted code 650 into an encrypted memory 670 at a known guest address 672. The hypervisor 610 is configured to protect the known guest address 672. In an example, the trusted code 650 includes a first instruction 680, one or more intermediate instructions 682, and a final instruction 684. The first instruction 680 and the final instruction 684 are exits 688 to the hypervisor 610. The hypervisor 610 is also configured to execute the condition checker 652 and detect an inconsistency 690 in guest memory 694.

An inconsistency may be a virus, malware, Trojan, spyware or cookie (e.g., tracking cookie) associated with a memory location. The inconsistency may also be detected based on contents of a memory location being modified due to programmatic behavior that exceeds the intention of the original programmer or program constructs. For example, the inconsistency may be memory corruption, bizarre or unexpected memory behavior, etc. When executing the condition checker 652, the condition checker may scan, monitor or test memory entries to detect an inconsistency 690.

For example, the condition checker 652 may monitor file changes or monitor memory entries for specific virus activity patterns. In an example, the checker 652 may use a heuristic-based detection algorithm to compare signatures of known inconsistencies (e.g., viruses, malware, etc.) against memory locations. Additionally, the condition checker 652 may include code that references a detection file, database, or dictionary that contains known inconsistency signatures. The detection file, database, or dictionary may be updated regularly to ensure that the consistency checker 652 is capable of detecting new inconsistencies. In another example, the consistency checker 652 may perform behavior based detection by running tests or monitoring behavior associated with memory entries or memory locations to determine if the memory is displaying strange or unexpected behavior based on the tests. Memory entries or locations may be checked one at a time or in parallel. In an example, after a memory entry or location passes inspection, the condition checker 652 may move to the next entry or location in encrypted guest memory.

By loading the trusted code 650 into the encrypted memory 670 and executing the condition checker 652 to detect an inconsistency 690, the system 600 may advantageously detect inconsistencies such as viruses in encrypted TEEs, such as encrypted virtual machines while using hypervisor-level solutions. For example, the trusted code 650 may include an exit 688 to the hypervisor 610 such that the hypervisor 610 can make at least the portion of the trusted code including the condition checker 652 "Executable" while making other guest code, such as regular guest code as "Non-executable." Since the regular guest code may be non-trusted and may include an inconsistency, such as a virus, the regular guest code is set to "Non-executable" while the condition checker 652 scans the encrypted guest memory 694. Then, the hypervisor can verify whether the guest 660 is virus free before returning to the guest 660 to ensure the TEE operates in a safe manner.

It will be appreciated that all of the disclosed methods and procedures described herein can be implemented using one or more computer programs or components. These components may be provided as a series of computer instructions on any conventional computer readable medium or machine readable medium, including volatile or non-volatile memory, such as RAM, ROM, flash memory, magnetic or optical disks, optical memory, or other storage media. The instructions may be provided as software or firmware, and/or may be implemented in whole or in part in hardware components such as ASICs, FPGAs, DSPs or any other similar devices. The instructions may be configured to be executed by one or more processors, which when executing the series of computer instructions, performs or facilitates the performance of all or part of the disclosed methods and procedures.

It should be understood that various changes and modifications to the example embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A system includes:
    a hypervisor;
    a memory; and
    boot firmware stored in the memory, wherein the boot firmware is configured to execute on a processor to:
        load a trusted code that includes a condition checker from the hypervisor,
        check a signature of the trusted code,
        verify the signature is trusted by a guest, and
        load the trusted code into an encrypted memory at a known guest address,
    wherein the hypervisor is configured to:
        protect the known guest address, wherein the trusted code includes a first instruction, one or more intermediate instructions, and a final instruction, and wherein the first instruction and the final instruction are exits to the hypervisor,
        execute the condition checker by sending a notification to the guest, detecting a first exit to the hypervisor, making the trusted code executable, wherein the trusted code including the condition checker is executed to obtain an execution result, detecting a second exit to the hypervisor, and loading the execution result from the guest, and
        detect an inconsistency in guest memory.

2. The system of claim 1, wherein the notification is an interrupt.

3. The system of claim 1, wherein the condition checker is an antivirus checker and the inconsistency is a virus.

4. The system of claim 2, wherein the execution result includes at least one of a type of virus detected and a quantity of viruses detected.

5. The system of claim 2, wherein the execution result includes one of a passing status and a failure status.

6. The system of claim 1, wherein guest code includes trusted code and non-trusted guest code, and wherein the hypervisor is further configured to:
    make non-trusted guest code executable, and
    return into an encrypted virtual machine associated with the guest.

7. The system of claim 1, wherein making the trusted code executable includes making non-trusted code non-executable.

8. The system of claim 7, wherein making the trusted code executable includes changing a protection identifier associated with the known guest memory location to read-only.

9. A method comprising:
    loading, by a boot firmware, a trusted code that includes a condition checker from a hypervisor;

checking, by the boot firmware, a signature of the trusted code;

verifying, by the boot firmware, the signature is trusted by a guest;

loading, by the boot firmware, the trusted code into an encrypted memory at a known guest address, wherein the trusted code includes a first instruction, one or more intermediate instructions, and a final instruction, and wherein the first instruction and the final instruction are exits to the hypervisor;

protecting, by the hypervisor, the known guest address;

executing, by the hypervisor, the condition checker by sending a notification to the guest, detecting a first exit to the hypervisor, making the trusted code executable, wherein the trusted code including the condition checker is executed to obtain an execution result, detecting a second exit to the hypervisor, and loading the execution result from the guest; and detecting, by the hypervisor, an inconsistency in guest memory.

10. The method of claim 9, wherein detecting that the guest failed to exit to the hypervisor after receiving the notification indicates the guest includes at least one inconsistency.

11. The method of claim 9, wherein the notification is an interrupt.

12. The method of claim 9, wherein the condition checker is an antivirus checker and the inconsistency is a virus.

13. The method of claim 12, wherein the execution result includes at least one of a type of virus detected and a quantity of viruses detected.

14. The method of claim 12, wherein the execution result includes one of a passing status and a failure status.

15. The method of claim 9, wherein guest code includes trusted code and non-trusted guest code, the method further comprising:

making, by the hypervisor, non-trusted guest code executable; and returning, by the hypervisor, into an encrypted virtual machine associated with the guest.

16. The method of claim 9, wherein making the trusted code executable includes making non-trusted code non-executable.

17. The method of claim 16, wherein making the trusted code executable includes changing a protection identifier associated with the known guest memory location to read-only.

18. A non-transitory machine-readable medium storing code, which when executed by a processor is configured to:

load a trusted code that includes a condition checker from a hypervisor;

check a signature of the trusted code;

verify the signature is trusted by a guest;

load the trusted code into an encrypted memory at a known guest address;

protect the known guest address, wherein the trusted code includes a first instruction, one or more intermediate instructions, and a final instruction, and wherein the first instruction and the final instruction are exits to the hypervisor;

execute the condition checker by sending a notification to the guest, detecting a first exit to the hypervisor, making the trusted code executable, wherein the trusted code including the condition checker is executed to obtain an execution result, detecting a second exit to the hypervisor, and loading the execution result from the guest; and detect an inconsistency in guest memory.

* * * * *